Oct. 7, 1947.  P. HEFTLER  2,428,708

TURBOSUPERCHARGER

Filed Oct. 22, 1943

INVENTOR

Paul Heftler

UNITED STATES PATENT OFFICE 2,428,708

TURBOSUPERCHARGER

Paul Heftler, Windsor, Ontario, Canada

Application October 22, 1943, Serial No. 507,307

6 Claims. (Cl. 60—13)

The powerplants of many present day airplanes are combinations of gasoline engines and turbo-superchargers. In each of these complex powerplants, the exhaust gas from the engine goes to the nozzlebox of a turbine, flows through nozzles in the wall of the nozzlebox and strikes the blades of a turbine wheel and makes it turn at high speed. The turbine wheel is on one end of a shaft that carries the blower or impeller of a centrifugal supercharger at the other end, the combination of turbine and supercharger being called a "turbo-supercharger" or simply a "turbo." The supercharger draws air from the atmosphere, compresses it and forces it into the engine, so that the engine can get its full charge of air and develop its full power even at high altitudes. One of the best examples of such a complex engine-turbo powerplant is the combination of Wright R1820-97 engine and General Electric B-2 turbo on the Boeing "Flying Fortress," which has been flown, according to published reports, up to over 40,000 ft.

Why turbo-regulators have been needed

This complex engine-turbo powerplant has its virtues and its faults, and one of its faults is its complexity. Up until now, it has not been possible to make a good powerplant with just an engine and a turbo; it has been tried, but the attempts were failures because the power developed by the complex powerplant would not remain steady but would rise and fall in cycles even though the positions of the engine throttle, constant speed propeller control and turbo waste gate remained fixed.

This lack of stability occurs because a slight increase in the amount of exhaust gas flowing through the nozzles of the turbine causes an almost equal or perhaps an even greater percentage increase in the quantity of air being pumped by the blower or supercharger. Then, when there is a slight accidental increase in the quantity of air pumped by the supercharger, as will happen with a slight change in the speed of the airplane through the air, the additional air together with some additional gasoline is turned into exhaust gas by the engine and pumped back by it to the turbine. There, the greater supply of exhaust gas causes the nozzlebox pressure to rise and more gas to flow out through the nozzles. This, in turn, speeds up the turbo and causes it to pump more air than before. This completes a vicious circle, and the power of the engine and turbo continues to increase until, at higher powers, the efficiency of the turbo decreases so much that this building-up process breaks down. Then, a little drop in the amount of air being pumped by the supercharger results in the turbine getting less exhaust gas, and the turbo slows down and pumps less air than before. Thus another but opposite vicious circle is set up, and the power of the engine and turbo continues to drop until a further drop in the speed of the turbo would cause but little change in the amount of air being pumped or sucked into the engine.

These two vicious circles of building up and cutting down power follow each other in cycles, and they prevent the engines from being operated steadily at the most efficient speed and manifold pressure. The unsteady power also makes it impossible to fly the airplane steadily, as is needed for accurate bombing or tight formation flying.

What turbo regulators do

The unsteadiness of power described above can be prevented or at least reduced to almost nothing by holding steady the pressure of the exhaust gas in the nozzle-box of the turbo or by holding steady the pressure of the air pumped to the engine by the turbo. Turbo regulators try to do one or the other of these two things.

The well-known Eclipse hydraulic turbo regulator tries to hold the nozzle-box pressure steady by opening or closing an exhaust escape valve or waste gate more or less as the pressure starts to rise or fall. It does this fairly well, unless the oil that is supposed to operate the regulator congeals in the cold at high altitudes or some other trouble occurs.

The newer Minneapolis-Honeywell electronic turbo regulator breaks the vicious circles by holding steady the pressure of the air supplied to the engine by the turbo. This could be done by letting more or less of this air escape; but this would require a larger and heavier turbo to pump the extra air. Instead, the pressure of this air is held steady by opening the waste gate more or less and thus causing the power of the turbine to drop or rise as the air pressure starts to rise or fall. This is not done simply, because a change in the position of the waste gate does not at once change the pressure of the air; it changes the pressure of the exhaust gas, this changes the force of the gas blowing on the turbine wheel, and it takes a second or two for the speed of the turbo to change much.

To prevent the regulator from moving the waste gate too far before the speed of the turbo changes enough to adjust the pressure of the air requires that the regulator be fairly complicated.

Each electronic turbo regulator includes two transformers, six potentiometers, two metal bellows, a two-phase electric motor with a high-reduction gear train and a magnetic clutch, a phase shifting network, an accelerometer flywheel, a pair of flyball weights operating two clutches connected to another gear train, a four-tube vacuum tube amplifier, and quite a few links, levers, springs and wires, and it requires a rotary converter to provide it with 400 cycle A. C. to run it. Each of these controls weighs about twenty pounds and costs about two hundred dollars.

How to do without turbo regulators

The vicious circles which cause the power of an engine and turbo to swing up and down can be broken by much simpler means than turbo regulators. Instead of having some more or less complicated automatic control mechanism to move the waste gate, the waste gate can be made to move itself so that any change in the amount of exhaust gas being pumped to the turbo by the engine will cause a much smaller change in nozzle box pressure than there would be in a standard turbo. This can be done by pivoting the waste gate a little off center so that the pressure of the gas in the nozzle box tends to open it and by providing a spring to hold the waste gate partly closed against the pressure of the gas. The pressure of the gas and therefore the speed of the turbo and the amount of supercharging which it provides can be adjusted by changing the tension of the spring.

Why this simple arrangement works can be explained easily, if it is not already obvious. With a fixed waste gate, an increase of 1.00% in the total flow of exhaust gases causes the flow through both the waste gate and the nozzles to increase by 1.00%. With a spring-loaded unbalanced waste gate, a similar increase in the total flow may cause the flow through the waste gate to increase by 1.75% and the flow through the nozzles to increase by only .25%. The exact percentages depend on the relative sizes of the nozzle openings and the waste gate opening, on the amount of offset of the waste gate, and on the stiffness of the springs. In any case, the increase in the gas flowing through the nozzles will be only a fraction of that needed to make the turbo pump enough air to continue that increase. Therefore the vicious circles that occur with a fixed waste gate will not be created, and the power of the engine and turbo will be stable without an automatic control or regulator of any kind.

It might seem that such a simple arrangement would not work. On the one hand, there is the possibility that the exhaust gas rushing by the gate would make it flutter or swing back and forth. On the other hand, friction might prevent the waste gate from adjusting itself to the pressure of the gas. However, actual flight tests carried out at all engine powers and at all altitudes up to 35,000 ft. show that neither of these things happen; instead, the gas flows steadily and does not flutter the gate, and the vibration of the engine eliminates the effect of friction.

Specific forms of the invention

Two of the many ways in which the turbo may be constructed to carry out the invention are shown in the drawing, in which.

Figure 1:
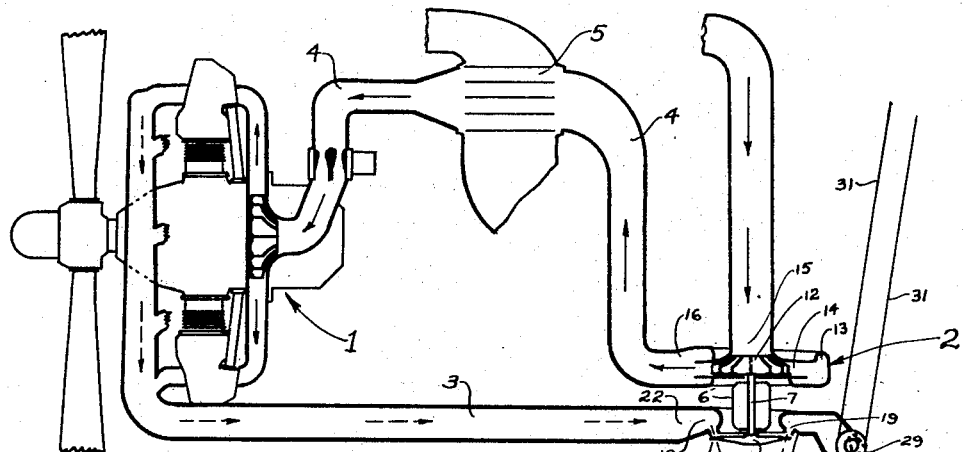
Figure 1 is a diagram of an engine and turbo powerplant in which the turbo is made as explained in general above.
Figure 2:
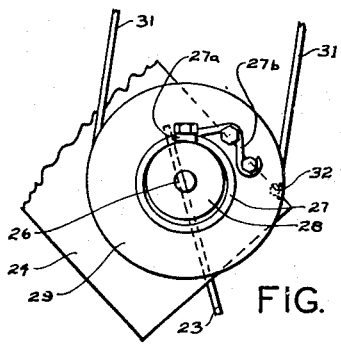
Figure 2 is an enlarged side view of the new part of the turbo shown in Fig. 1.
Figure 3:
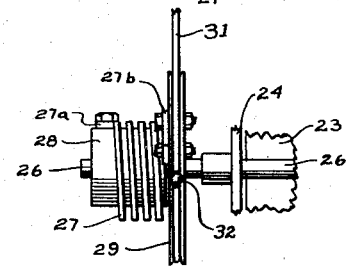
Figure 3 is a rear view of the part of the turbo shown in Fig. 2.

The principal parts of the powerplant shown in Fig. 1 are an engine 1 and a turbo-supercharger or turbo 2, which are connected together by an exhaust collector ring and pipe 3 for leading exhaust gas from the engine to the turbo, and a carburetor air duct 4 for leading compressed air from the turbo 2 through an intercooler 5 to the engine. (This general arrangement is the conventional one described in some detail in the Jan. 1944 issue of the "Transactions of the A. S. M. E.)

The improvement lies in the turbo 2, which is like the standard General Electric turbo (such as the type B-2) in everything except the waste pipe and waste gate and in the way in which the control cable or other control member is connected to the waste gate shaft. The new turbo includes a conventional bearing and pump casing 6 in which the main shaft 7 is supported on ball and roller bearings. The shaft 7 carries a bucket or turbine wheel 11 on one end and an impeller or blower 12 on the other, and an oil pump drive gear is mounted in the center. (The bearings, the gear and the oil pump are not shown in the drawing, for the sake of simplicity.)

A compressor casing 13, which encloses a diffuser 14, surrounds the impeller and serves to guide air to it from the air inlet 15 and to collect the air from it and lead it to the outlet 16. In its passage through the diffuser 14, the air which has left the periphery of the impeller 12 at high speed is gradually slowed up by the more slowly moving air in front of it, so it presses upon and compresses that air, and itself is compressed in a like manner by the air that follows it. Thus, all of the air leaves the diffuser 14 and goes through the outlet 16 of the turbo 5 to the carburetor 8 on the engine 1 in a compressed state.

The impeller 12 is driven through the shaft 7 by the turbine or bucket wheel 11, which, in turn is driven by jets of exhaust gas striking the buckets or blades 17 which form the rim of the wheel. The jets of exhaust gas are formed by exhaust gas escaping from the nozzlebox 18 through sloping slots or nozzles 18 in the nozzle diaphragm 21 which forms the bottom of the nozzlebox and lies directly above the ring of buckets 17. The nozzlebox 18 is supplied with exhaust gas from the engine 1 through the exhaust pipe 3 and the nozzlebox inlet 22, and the pressure of the gas in the nozzlebox is regulated by a waste gate 23 located in a waste pipe 24 leading from the nozzlebox. The improvement which is the main invention lies in this portion of the turbosupercharger.

From the nozzlebox 18, the wastepipe 24 leads to an outlet 25 having an area of approximately twenty square inches for this particular size of turbosupercharger. The wastegate 23 is shaped so that it lies in an oblique position when it is closing the wastepipe, and it is mounted on a shaft 26 which extends horizontally across the wastepipe. This arrangement differs from the usual one in that the shaft is located off center and that the area of the wastegate 23 on the down stream side of the shaft is materially larger than the area on the upstream side. With this arrangement, pressure of the exhaust gas in the nozzlebox 18 tends to swing the wastegate 23 open, as contrasted with the conventional wastegate which is mounted on a central shaft and which, because of the uneven distribution of pressure of the gas flowing by it, tends to swing shut.

Another important feature of the wastegate arrangement is the fact that the wastegate 23 is operated through a spring 27 instead of through a rigid connection. The spring 27 is a helical torsion spring having one end 27a bolted to a hub 28 fixed to the shaft 26 of the wastegate and the other end 27b bolted at two spaced points to a pulley 29 which is free to turn on the shaft. The coils of the spring are spaced out from the hub so that they will not grip the hub as they contract when the spring is tensioned. The pulley 29 has a control cable 31 around it and fixed to it at one point by any convenient means 32, such as a cable clamping screw like those used on propeller governor pulleys or a swaged-on bead that fits into a notch or enlargement in the groove of the pulley.

The stiffness of the spring 27 is not critical, and it can be such that, when the pressure of the gas inside of the nozzlebox is about 20 in. Hg and of the air outside is about 10 in. Hg and the flow of gas through the wastegate is large enough so that this nozzlebox pressure is maintained with the wastegate half open, the pulley must be turned about eighty degrees to tension the spring enough to hold the wastegate against this pressure difference.

With the spring-loaded unbalanced wastegate 23, the combination of engine and turbosupercharger forms a stable powerplant, and the turbo needs no other control than the cable 31. When the engine is operating at full throttle with the turbosupercharger in operation and it is desired to increase or decrease the power being delivered by the engine, its manifold pressure can be changed by merely adjusting the position of the pulley 29 on the turbosupercharger by means of the control cable 31. It is unnecessary to have any other control means than the cable because, with this improved turbosupercharger, the complex engine-turbo powerplant is inherently stable.

Figure 4:
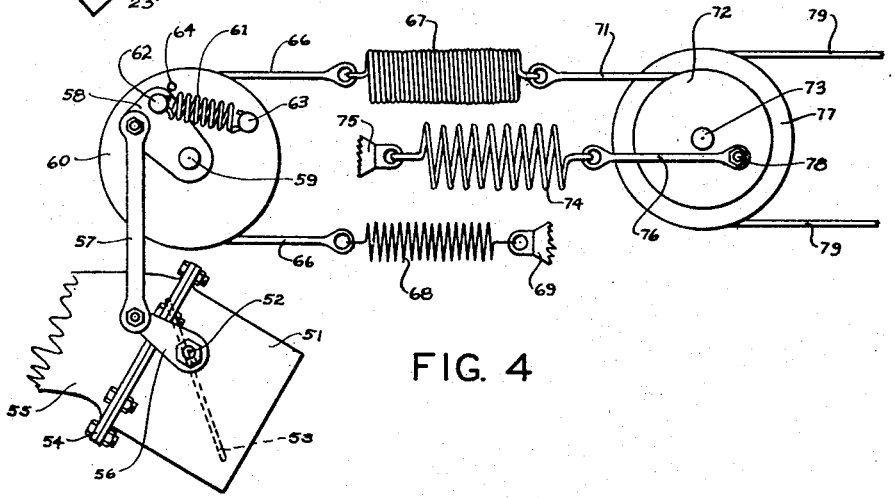
Figure 4 shows another way of carrying out the invention.

Another form of the invention is shown in Figure 4, and this form is one which can be constructed from the B-2 turbos now in wide use. In this form of the invention, the standard wastepipe and wastegate are removed and replaced by a wastepipe 51 having the shaft 52 of the wastegate 53 offset about one inch from the axis of the wastepipe. This substitution is easy because the wastepipe bolts to a flange 54 on the outlet of the nozzlebox 55. The wastegate 53 is elliptical in shape so that it slants across the wastepipe 51 when it is fully closed and does not have as far to swing to be fully open as if it were round.

The wastegate shaft 52 has an arm 56 fixed to one end, and the arm 56 is connected by a link 57 to a sector 58 pivoted on a shaft 59. The shaft 59 also carries a pulley 60, but the sector and pulley are not fixed to each other but can rotate one relative to the other. Such rotation, however, is normally prevented by a spring 61 which extends between a pivot 62 on the sector and a pivot 63 on the pulley and holds the sector against a stop 64 on the pulley. The tension in the spring 61 when the sector is against the stop 64 is just great enough to hold the wastegate 53 against the pressure of the gas in the wastepipe when the pressure is great enough to drive the turbo at the maximum allowable speed when the airplane is at the highest altitude at which the powerplant can deliver its rated power without overspeeding the turbo. The spring 61 and the positions of the pivots 62 and 63 are selected so that the rate at which the tension in the spring increases as the pivots 62 and 63 swing apart when the sector moves away from the stop 64 is exactly offset by the rate at which the spring moves in towards the shaft 59. Thus the torque acting to move the sector 58 towards the stop 64 will be practically constant. For example, if the spring has an initial tension of 65 lb. and the angle between the two pivots is 90°, and the pivots are 2 in. out from the shaft, the spring should have a rate of 17.1 lb./in. Thus the torque which is exerted on the shaft 52 of the wastegate through the link 57 will remain practically constant as the sector 58 pulls away from the stop 64, and this torque will be the maximum torque which can be exerted on that shaft irrespective of the position of the pulley 60. The speed of the turbo will thus be automatically limited to the maximum allowable, and danger of overspeeding will be avoided.

The pulley 60 carries a cable 66 which is fixed to it at one point in either of the ways mentioned above in connection with the principal form of the invention and which has its ends connected to two springs 67 and 68. The spring 68 which is connected to the end of the cable which, when pulled, will open the wastegate 53 is a light spring that serves only to open the wastegate when the tension on the other end of the cable is very light, and it is connected to a fixed anchor 69. The other spring 67 is a more powerful one, and it may have a rate of 50 lb./in. or 60 lb./in. if the pulley 60 has a pitch diameter of 5 in. and the shaft 52 of the wastegate is offset 1 in. from the center of the wastepipe.

The spring 67 is tensioned by a cable 71 fixed to a pulley 72 which turns on a shaft 73 with another pulley 77, the two pulleys 72 and 78 being fixed together. A balancing spring 74, which is about twice as stiff as the spring 67, is connected to an anchor 75 and to a link 76 pivoted at 78 to the pulley 72 or to an arm fixed to the pulley 72. The pivot 78 is located on the pulley or the arm so that, as the spring 74 is stretched, the link 76 approaches the axis of the shaft 73, and the torque which it exerts on the pulley 72 decreases instead of increases. Thus the torque exerted by the spring 74 will increase and decrease with the torque exerted by the spring 67, and the two will always be in approximate balance. This arrangement keeps to a minimum the forces which must be transmitted by the cable 79 which is fixed to the pulley 77 and by means of which the position of the pulleys 72 and 77 is adjusted. The cable 79 leads to the pilot's or engineer's control stand, where its position is set manually, or it can lead to an automatic control, such as a manifold pressure or carburetor air pressure regulator, which can adjust the cable to obtain whatever pressure is required.

Although the sector 58 and pulleys 60, 72 and 77 have been shown, for convenience, as being mounted on shafts 59 and 73 separate from the wastegate shaft 52, they can all be mounted on the wastegate shaft 52 so that they will form a more compact assembly with the rest of the supercharger. The sector 58 and the arm 56 would become one arm, the link 57 and spring 68 would be omitted, and the spring 67 would be made like the spring 27 in Figure 1 but would still act between the two pulleys or between arms replacing the pulleys.

While only two forms of the improved turbosupercharger have been described, the invention is not limited to these. These particular forms of the invention have been shown only as examples, and the skilled engineer who studies this disclosure will be able to devise numerous other forms of the invention, of which some may and others may not involve additional invention. The present invention, therefore, is not limited to these specific examples but includes any construction falling within the terms of any one of the following definitions.

I claim:

1. A turbosupercharger comprising an impeller, a turbine wheel having buckets and connected to the impeller to turn it, a nozzlebox adapted to receive exhaust gas and having nozzles through which at least a part of the exhaust gas can flow out against the buckets of the turbine wheel to turn it and having a waste gas passage through which the surplus gas can escape, a valve in the passage movably mounted so that the pressure of the gas in the nozzlebox tends to open it, and a spring connection to the valve for holding it at least partly closed, the spring connection being constructed and arranged to exert a practically constant force on the valve over a substantial working range.

2. A turbosupercharger comprising an impeller, a turbine wheel having buckets and connected to the impeller to turn it, a nozzlebox adapted to receive exhaust gas and having nozzles through which at least a part of the exhaust gas can flow out against the buckets of the turbine wheel to turn it and having a waste gas passage through which the surplus gas can escape, a valve in the passage movably mounted so that the pressure of the gas in the nozzlebox tends to open it, and spring means tending to close the valve against the pressure of the gas, the spring means being the only means tending to close the valve and being constructed and arranged to exert on the valve a force which increases relatively rapidly up to a predetermined value as the valve is forced open against the spring means and which increases relatively slowly above that predetermined value.

3. A turbosupercharger comprising an impeller, a turbine wheel having buckets and connected to the impeller to turn it, a nozzlebox adapted to receive exhaust gas and having nozzles through which at least a part of the exhaust gas can flow out against the buckets of the turbine wheel to turn it and having a waste gas passage through which the surplus gas can escape, a shaft extending across the waste gas passage substantially to one side of the center of the passage, a valve plate fixed to the shaft, a member mounted to rotate relative to the shaft and approximately on the axis of the shaft, means for adjusting the angular position of the member, and a spring connecting the member to the shaft.

4. An internal combustion power plant comprising an engine and a turbosupercharger driven by exhaust gas from the engine and supplying compressed air to it for combustion, the power plant including a waste gas passage for permitting exhaust gas to escape without performing work in the turbosupercharger, a valve in the passage for controlling the escape of the gas and constructed and arranged so that the pressure of the gas tends to open it, a control member, a spring connected at one end to the control member and at the other end to the valve and stressed only enough to hold the valve yieldingly against the pressure of the gas, and control means for adjusting the position of the control member from a distance.

5. An internal combustion power plant comprising an engine and a turbosupercharger driven by exhaust gas from the engine and supplying compressed air to it for combustion, the power plant including a waste gas passage for permitting exhaust gas to escape without performing work in the turbosupercharger, a valve in the passage for controlling the escape of the gas and constructed and arranged so that the pressure of the gas tends to open it, a spring connected at one end to the valve to hold it against the pressure of the gas, and control means for adjusting the position of the other end of the spring while the power plant is operating.

6. A turbosupercharger installation comprising an impeller, a turbine wheel having buckets and connected to the impeller to turn it, a nozzlebox adapted to receive exhaust gas under pressure and having nozzles through which at least a part of the exhaust gas can flow out against the buckets of the turbine wheel to turn it, a waste gas passage through which surplus exhaust gas can escape, a valve in the passage movably mounted so that the pressure of the gas in the nozzlebox tends to open it, a spring mechanism tending to close the valve against the pressure of the gas, the spring mechanism and the valve being free to move without appreciable restraint in response to changes in the pressure of the gas, and control means extending away from the spring mechanism for adjusting the spring mechanism and changing the force exerted by the spring mechanism on the valve.

PAUL HEFTLER.

REFERENCES CITED

The following references are of record in the file of this patent:

UNITED STATES PATENTS

| Number | Name | Date |
|---|---|---|
| 2,247,151 | Clarke | Jan. 24, 1941 |
| 2,192,703 | Boller | Mar. 5, 1940 |
| 1,063,596 | Rice | June 3, 1913 |
| 1,097,259 | Nusim | May 19, 1914 |
| 1,156,613 | Moss | Oct. 13, 1915 |
| 1,263,056 | Graemiger | Apr. 16, 1918 |
| 1,267,880 | McBride | May 28, 1918 |
| 1,280,812 | Moss | Oct. 8, 1918 |
| 1,346,563 | Sherbondy | July 13, 1920 |
| 1,557,793 | Berger et al. | Oct. 20, 1925 |
| 2,386,096 | Ehrling | Oct. 2, 1945 |

FOREIGN PATENTS

| Number | Country | Date |
|---|---|---|
| 285,811 | Great Britain | Apr. 5, 1928 |